US012466220B2

(12) United States Patent
Scheepers (10) Patent No.: US 12,466,220 B2
(45) Date of Patent: Nov. 11, 2025

(54) DISMOUNTING MACHINE FOR DISMOUNTING A TIRE FROM A RIM, AND METHOD FOR DISMOUNTING A TIRE FROM A RIM

(71) Applicant: TECHNO GROUP BENELUX B.V., Roosendaal (NL)

(72) Inventor: Peter Scheepers, Roosendaal (NL)

(73) Assignee: TECHNO GROUP BENELUX B.V., Roosendaal (NL)

(*) Notice: Subject to any disclaimer, the term of this patent is extended or adjusted under 35 U.S.C. 154(b) by 386 days.

(21) Appl. No.: 18/033,877

(22) PCT Filed: Oct. 26, 2021

(86) PCT No.: PCT/NL2021/050647
§ 371 (c)(1),
(2) Date: Apr. 26, 2023

(87) PCT Pub. No.: WO2022/093015
PCT Pub. Date: May 5, 2022

(65) Prior Publication Data
US 2023/0398819 A1  Dec. 14, 2023

(30) Foreign Application Priority Data

Oct. 27, 2020 (NL) .................................. 2026774

(51) Int. Cl.
*B60C 25/05* (2006.01)
(52) U.S. Cl.
CPC ...... *B60C 25/0578* (2013.01); *B60C 25/0506* (2013.01)
(58) Field of Classification Search
CPC . B60C 25/05; B60C 25/0506; B60C 25/0527; B60C 25/0563; B60C 25/0578;
(Continued)

(56) References Cited

U.S. PATENT DOCUMENTS 8,342,223 B2 * 1/2013 Sotgiu ................. B60C 25/0527
157/1.24
8,869,864 B2 * 10/2014 Bonacini ............. B60C 25/0578
157/1.24
(Continued)

FOREIGN PATENT DOCUMENTS

CN   202727895 U    2/2013
CN   112297724 B  * 8/2021   ......... B60C 25/0578
(Continued)

*Primary Examiner* — David B. Thomas
(74) *Attorney, Agent, or Firm* — The Webb Law Firm (57) ABSTRACT

Provided is dismounting machine for dismounting a tire from a rim, including a supporting base frame that is provided with a vertical carrying body for a rim, wherein said carrying body is connected to the base frame, is rotatable by a motor relative to the base frame about a rotation axis that extends in a vertical direction, and is provided with fastening means for fastening a rim in a fixed position on an upper side of the carrying body, so that a principal axis of the rim thus fixed extends in a direction that coincides with the central rotation axis of the carrying body, so that rotation of the carrying body leads to rotation of the fixed rim about the principal axis, and a vertical column connected rigidly to the base frame, which is located at a distance from the carrying body, said column being provided with a guide arm and an auxiliary arm, which extend from the column in the direction of the carrying body, and which, movable independently of one another, are connected to the column, so that the guide arm and the auxiliary arm can be placed independently of one another in a working position as separate tools for dismounting a tire from a rim fixed on the carrying body.

20 Claims, 3 Drawing Sheets (58) Field of Classification Search
CPC ..... B60C 25/125; B60C 25/13; B60C 25/138; B60C 25/0545
See application file for complete search history.

(56) References Cited

U.S. PATENT DOCUMENTS

| | | | |
|---|---|---|---|
| 8,973,640 B1* | 3/2015 | Hanneken | B60C 25/0578 157/1.22 |
| 9,090,135 B2* | 7/2015 | Magnani | B60C 25/138 |
| 9,139,055 B2* | 9/2015 | Bonacini | B60C 25/138 |
| 9,168,797 B2* | 10/2015 | Ferrari | B60C 25/138 |
| 9,216,621 B2* | 12/2015 | Barbetti | B60C 25/0578 |
| 9,610,812 B2* | 4/2017 | Ferrari | B60C 25/0578 |
| 10,000,101 B2 | 6/2018 | Corghi | |
| 10,065,462 B2* | 9/2018 | Gonzaga | B60C 25/0563 |
| 10,245,909 B2* | 4/2019 | Corghi | B60C 25/056 |
| 10,828,950 B2* | 11/2020 | Corghi | G01M 17/022 |
| 11,679,633 B2* | 6/2023 | Corghi | B60C 25/138 157/1.24 |
| 2009/0236046 A1* | 9/2009 | Mimura | B60C 25/138 157/1.1 |
| 2012/0061028 A1* | 3/2012 | Barbetti | B60C 25/138 157/1.24 |
| 2016/0023524 A1* | 1/2016 | Gonzaga | B60C 25/132 29/894.31 |
| 2018/0194179 A1* | 7/2018 | Ferrari | B60C 25/0578 |

FOREIGN PATENT DOCUMENTS

| | | | | |
|---|---|---|---|---|
| EP | 2524820 A1 | 11/2012 | | |
| EP | 2962876 A1 | 1/2016 | | |
| EP | 3293020 A1 * | 3/2018 | ........... | B60C 25/056 |
| EP | 2962877 B1 * | 7/2018 | ......... | B60C 25/0563 |
| EP | 3659832 A1 | 6/2020 | | |
| NL | 2022247 B1 | 7/2020 | | |
| WO | WO-2014129476 A1 * | 8/2014 | ......... | B60C 25/0578 |

\* cited by examiner

DISMOUNTING MACHINE FOR DISMOUNTING A TIRE FROM A RIM, AND METHOD FOR DISMOUNTING A TIRE FROM A RIM

CROSS-REFERENCE TO RELATED APPLICATIONS

This application is the United States national phase of International Application No. PCT/NL2021/050647 filed Oct. 26, 2021, and claims priority to The Netherlands Patent Application No. 2026774 filed Oct. 27, 2020, the disclosures of which are hereby incorporated by reference in their entireties.

BACKGROUND OF THE INVENTION

Field of the Invention

The present invention relates to a dismounting machine for dismounting a tire from a rim, and a method for dismounting a tire from a rim.

Description of Related Art

In the relevant field, a type of dismounting machine is known that comprises a supporting base frame that is provided with:
- a vertical carrying body for a rim, wherein said carrying body is connected to the base frame, is rotatable by a motor relative to the base frame about a rotation axis that extends in a vertical direction, and is provided with fastening means for fastening a rim in a fixed position on an upper side of the carrying body, so that a principal axis of the rim thus fixed extends in a direction that coincides with the central rotation axis of the carrying body, so that rotation of the carrying body leads to rotation of the fixed rim about the principal axis,
- a vertical column connected rigidly to the base frame, which is located at a distance from the carrying body, said column being provided with a guide arm that can be placed in a working position as a tool for dismounting a tire from a rim fixed on the carrying body,
- wherein the column is provided with a motor-driven adjusting mechanism for adjusting the height of the guide arm on the column, and the guide arm is provided at a distal end with a guide head with a guiding surface that is designed for guiding an inner edge of a tire over an outer edge of the rim when the guide arm is placed in its working position between the outer edge of the rim and the inner edge of the tire.

In order to dismount a tire from the rim, with this type of dismounting machine the user should employ a tire lever, to move a first part of the inner edge of the tire manually both over the outer edge of the rim and over the guide head. During this, the guide head is placed in its working position, namely adjacent to the outer edge of the rim. Near the guide head, the user places a tire lever between the inner edge of the tire and the rim edge, in such a way that the end grips the inner edge of the tire, whereas the nearby middle portion of the tire lever is in contact with the rim edge. The rim edge thus forms a temporary hinge point for a lever movement of the tire lever, with which the user pulls the inner edge over the rim edge and over the guide head.

Then the rim is rotated by the carrying body while the guide head maintains a fixed working position, so that the other part of the tire that still lies within the outer edge of the rim is led by the guide head over the outer edge, until the whole inner edge of the tire is brought outside the rim.

A disadvantage of the use of this dismounting machine is that this requires a manual first step, which requires the necessary force. During these operations the user may even sustain an injury. In addition, there is a risk of damage of the rim or tire when the manual step is not carried out in a controlled manner.

In American U.S. Pat. No. 10,000,101 it is therefore proposed to provide a dismounting machine with a motor-driven hook, which is a component of the guide head. This hook grips onto an inner edge of the tire, both while moving a first part of the inner edge over the rim, and also during the subsequent rotation of the rim wherein the other part of the tire is led over the rim by the hook and the guide head.

Although this dismounting machine is, owing to the motor-driven hook, an improvement relative to the manual movement of a first part of the inner edge of the tire, there are also disadvantages connected with this specific configuration.

An important disadvantage is that the hook, during rotation of the rim, continuously exerts a considerable force on the inner edge of the tire wherein considerable friction and stretching occurs, which may reduce the strength and integrity of the inner edge.

SUMMARY OF THE INVENTION

The present invention aims to overcome or lessen the aforementioned disadvantages of known dismounting machines from the prior art.

This aim is achieved by a first aspect of the invention, said aspect being directed at a dismounting machine for dismounting a tire from a rim, comprising a supporting base frame that is provided with:
- a vertical carrying body for a rim, wherein said carrying body is connected to the base frame, is rotatable by a motor relative to the base frame about a rotation axis that extends in a vertical direction, and is provided with fastening means for fastening a rim in a fixed position on an upper side of the carrying body, so that a principal axis of the rim thus fixed extends in a direction that coincides with the central rotation axis of the carrying body, so that rotation of the carrying body leads to rotation of the fixed rim about the principal axis,
- a vertical column connected rigidly to the base frame, which is located at a distance from the carrying body, said column being provided with a guide arm and an auxiliary arm, which extend from the column in the direction of the carrying body, and which, movable independently of one another, are connected to the column, so that the guide arm and the auxiliary arm can be placed independently of one another in a working position as separate tools for dismounting a tire from a rim fixed on the carrying body,
- wherein the column is provided with a motor-driven adjusting mechanism for adjusting the height of the guide arm on the column, and the guide arm is provided at a distal end with a guide head with a guiding surface that is designed for guiding an inner edge of a tire over an outer edge of the rim when the guide arm is in its working position between the outer edge of the rim and the inner edge of the tire,
- wherein the auxiliary arm is connected swivelling with a proximal end to the column, and a distal end is provided with a hook arm, a distal end of which is connected to a hook, said hook being designed to grip behind an inner edge of a tire when the auxiliary arm is put in its working position, wherein the hook arm comprises a motor-driven hook mechanism for moving the hook in a vertical direction for moving an inner edge of a tire over an outer edge of the rim when the auxiliary arm is put in its working position, and wherein the auxiliary arm is connected to the column, swivelling in such a way that the hook can follow a circular path about the rotation axis of the carrying body.

A dismounting machine of this kind is suitable, in the dismounting of a tire from a rim, advantageously for carrying out the following steps in succession:

i) arranging the auxiliary arm and the guide arm in their respective working positions relative to the carrying body on which a rim with mounted tire is fixed, wherein the guide head is positioned adjacent to the outer edge of the rim, and the hook of the hook arm is in the vicinity of the guide head and is placed in close contact behind a first part of the inner edge of the tire;

ii) moving the hook vertically upwards so that the first part of the inner edge of the tire is moved over the outer edge of the rim, and at the same time is moved over the guiding surface of the guide head;

iii) bringing the hook to a fixed height, wherein this is above the outer edge of the rim, while it remains in close contact with the inner edge of the tire;

iv) then rotating the carrying body so that the fixed rim and the tire are rotated, while the hook remains in close contact with the first part of the inner edge of the tire during the rotation of the rim, so that the hook moves along on the circular path that the inner edge of the tire follows during the rotation of the rim, and wherein at the same time the guide head is held in its working position so that a passing part of the inner edge of the tire is led over the outer edge of the rim by the guiding surface.

With the above manner of dismounting, it is achieved that the main force that the hook exerts on the inner edge of the tire is limited to the initial movement over the outer edge of the rim and over the guide head. Then during rotation of the rim the hook moves together with the inner edge, and the interaction of forces between the hook and the inner edge is very slight, because there is no question of friction, and the stretching is almost negligible. The frictional and stretching forces that the inner edge of the tire experiences during rotation are thus limited to the interaction with the guiding surface of the guide head, so that the inner edge of the tire is exposed to less stretching and frictional forces during dismounting of the tire.

The invention achieves this advantage relative to the prior art because the auxiliary arm, which is provided with the motor-driven hook, is mounted swivelling and is movable independently of the guide head, which is actually held in a fixed position during rotation.

Thus, the invention provides a dismounting machine provided with a motor-driven hook, which offers the advantage that less damage occurs through stretching and friction during dismounting of a tire from a rim.

In the context of the invention, it is noted that the auxiliary arm is preferably connected swivelling on the column without motor drive. Setting of the auxiliary arm in its working position is then carried out manually, and following of a circular path around the carrying body happens automatically when the rim is rotated.

It is preferable, for the dismounting machine according to the invention, for the auxiliary arm to comprise at least two sections linked to each other, wherein a first section with a proximal end is connected swivelling to the column, and with a distal end is connected swivelling to a proximal end of a second section, wherein a distal end of the second section forms the distal end of the auxiliary arm.

Such a configuration of the auxiliary arm is very suitable for allowing the hook to follow a circular path about the rotation axis of the carrying body.

As an alternative, the auxiliary arm may be built up from a first section with a proximal end that is connected swivelling to the column, and a distal end of which is provided with an extendable second section, so that the length of the auxiliary arm can be varied.

In the dismounting machine according to the invention, it is advantageous for one or more swivel joints of the auxiliary arm to be configured in such a way that the swivel joint achieves a swivelling about a vertical axis.

A suitable swivel joint in this context is a hinge connection.

Especially preferably in the dismounting machine according to the invention, the auxiliary arm is connected swivelling to the column at a height that lies above the maximum height setting of the guide arm.

In this way, the independent movability of the auxiliary arm and guide arm is limited as little as possible.

In the dismounting machine according to the invention, the motor-driven hook mechanism may comprise a working arm that is connected with a distal end to the hook, and said distal end is movable along a vertical axis, and preferably is movable over a distance of at least 15 to 45 cm.

For example, the hook mechanism comprises a telescopically movable working arm. The range of the movement coincides with the distance over which the inner edge of a tire must be moved from a mounted position to a dismounted position.

More preferably, in the dismounting machine according to the invention, the hook is mounted rotatably relative to the distal end of the auxiliary arm, so that rotation of the hook about a vertical rotation axis is possible.

Such rotation contributes further to the accompanying movement of the hook behind the inner edge of the tire during rotation of the carrying body with the rim fixed thereon. In addition, the rotating hook may simply be guided manually when this is placed in its working position for gripping on the tire.

The dismounting machine according to the invention is preferably configured in such a way that the hook arm comprises a coupling body that is connected at a first end to the hook, and is connected with a second end to the hook mechanism.

Preferably the coupling body is elongated and mounted in the vertical direction, and has for example a length of 30-40 cm.

It is advantageous for the invention if the hook is connected detachably to the hook mechanism by a coupling connection.

Thus, in the dismounting machine, a particular type of hook can easily be replaced with another type of hook, for example to make the hook arm suitable for another type of rim or tire.

For the dismounting machine, it is attractive if it comprises a pneumatic motor as the power source for the motor drive of the hook mechanism. Because the hook mechanism must exert a relatively large force under high resistance during the vertical movement of an inner edge of the tire over the rim, it is advantageous to carry this out with pneumatic drive.

Regarding the hook of the dismounting machine according to the invention, it is advantageous if the hook is configured as a curved body that comprises a bridge segment and a hook segment, wherein the bridge segment and the hook segment are mounted opposite each other in a common vertical plane, and wherein the bridge segment is an upper segment of the hook, and the hook segment is a lower segment of the hook that is arranged for gripping behind an inner edge of a tire, wherein the bridge segment extends over a bridge length from a first end that is connected to the hook arm, to a second end that is connected to the hook segment, and the hook segment extends over a hook length from a first end connected to the bridge segment, to a second end that coincides with a free end of the hook, wherein the bridge length in the horizontal direction is greater than the hook length in the horizontal direction, in particular 2 to 6 times greater.

A hook of this kind gives the result, owing to the long bridge segment, that the hook segment can project into a space under and behind the outer edge of the rim, where the inner edge of the tire is adjacent to the rim in the installed state. By moving the hook from top to bottom against the inner edge of the rim, the hook segment is forced behind the inner edge of the tire, so that it comes into engagement with the tire. Then during upward movement of the hook, first the longer, horizontal bridge segment is moved over the rim, wherein the hook at the same time is moved radially outwards and the tire is lifted over the rim.

In practice, for example the gripping length of the hook in the horizontal direction is 2 to 5 cm, and the bridge length in the horizontal direction is for example 4 to 20 cm.

With this kind of configuration of the hook of the dismounting machine, it is advantageous if an end part of the hook segment that comprises the free end of the hook is at an angle to the horizontal plane in the range from 0 to 30 degrees, and preferably tapers towards the free end.

More preferably, the free end then has a rounded top, which may further improve the movement of the hook segment behind the inner edge.

It is additionally advantageous for this kind of configuration of the hook if the bridge segment defines an imaginary bridge line that intersects the first end and the second end of the bridge segment, said bridge line having a diagonal orientation relative to the horizontal plane, and preferably is at an angle of 30 to 80 degrees to the horizontal plane.

It is advantageous, for the dismounting machine according to the invention, if the hook has an outer side with an outside surface that comprises rounded areas.

Since the hook is moved over the rim, or over the guide head, in order to move the tire over the rim, it is advantageous if the outer side of the hook has rounded areas in order to reduce any frictional resistance that occurs.

Particularly preferably, with the dismounting machine according to the invention, the guiding surface is provided with a recessed vertical sliding track over which an outer side of the hook can be moved with a sliding motion, in particular during movement of the hook in a vertical direction when an inner edge of a tire is being moved over an outer edge of the rim.

Thus, with the hook, the inner edge of the tire is moved over the rim without the hook being in sliding contact with the rim. In addition, the recessed vertical sliding track reduces the frictional resistance when the hook is moved in the vertical direction over the guiding surface.

In a preferred embodiment of the dismounting machine according to the invention, the guiding surface of the guide head comprises a bulge which, during dismounting of a tire from a rim fixed to the carrying body, interacts with the inner edge of the tire so that the inner edge of the tire is moved over the outer edge of the rim.

If the guiding surface according to the above embodiments is provided with a recessed vertical sliding track and a bulge, these are preferably at a distance from each other.

Preferably the dismounting machine according to the invention comprises an electric motor as the power source for the motor drive of the rotatable carrying body, and/or the height-adjustable guide arm.

According to a particularly advantageous embodiment of the dismounting machine, the carrying body is mounted on a table that is slidable horizontally relative to the base frame by a motor drive, preferably electric motor drive.

This table allows the fixed rim to be placed in a suitable position so that the guide arm is in its working position.

As an alternative, the guide head may be configured to be horizontally slidable relative to the column, with a motor drive.

In the dismounting machine according to the invention, the fastening means for fixing the rim preferably comprise at least one bolt and a matching nut.

It is also advantageous for the bolt to be movable between a working position and a position of rest, in such a way that the bolt in the position of rest is wholly or partially countersunk in the end of the carrying body, and in the working position projects above the end. The bolt is then preferably movable by motor from the position of rest to the working position under pneumatic pressure.

It is advantageous in practice if in the dismounting machine according to the invention one or more power sources for motor drive are installed within the base frame.

It is also advantageous in practice for the dismounting machine according to the invention to be provided with control units for the motor drive of movable components, and preferably also comprises operating pedals in the base frame for operating one or more control units.

The invention relates, according to a second aspect, to a method for dismounting a tire from a rim with a dismounting machine according to the first aspect of the invention, comprising the successive steps of:

i) arranging the auxiliary arm and the guide arm in their respective working positions relative to the carrying body on which a rim with mounted tire is fixed, wherein the guide head is positioned adjacent to the outer edge of the rim, and the hook of the hook arm is in the vicinity of the guide head and is placed in close contact behind a first part of the inner edge of the tire;

ii) moving the hook vertically upwards so that the first part of the inner edge of the tire is moved over the outer edge of the rim, and at the same time is moved over the guiding surface of the guide head;

iii) bringing the hook to a fixed height, wherein this is above the outer edge of the rim, while it remains in close contact with the inner edge of the tire;

iv) then rotating the carrying body so that the fixed rim and the tire are rotated, while the hook remains in close contact with the first part of the inner edge of the tire during the rotation of the rim, so that the hook moves along on the circular path that the inner edge of the tire follows during the rotation of the rim, and wherein at the same time the guide head is held in its working position so that a passing part of the inner edge of the tire is led over the outer edge of the rim by the guiding surface.

The advantages of this manner of dismounting a tire from a rim have already been discussed above, namely reduction of the risk of damage of the tire or of the rim.

In this method, preferably during step ii) the hook is moved in sliding contact over the guide head, wherein preferably the guide head is provided with a recessed vertical sliding track over which an outer side of the hook can be moved in a sliding motion.

This method leads to further reduction of the risk of damage of the tire or of the rim during dismounting of the tire from the rim.

EXAMPLES

Brief Description of the Drawings

The invention will be explained hereunder on the basis of some preferred embodiments of the invention, which are illustrated in the appended figures, where.

DESCRIPTION OF THE INVENTION

Figure 1:
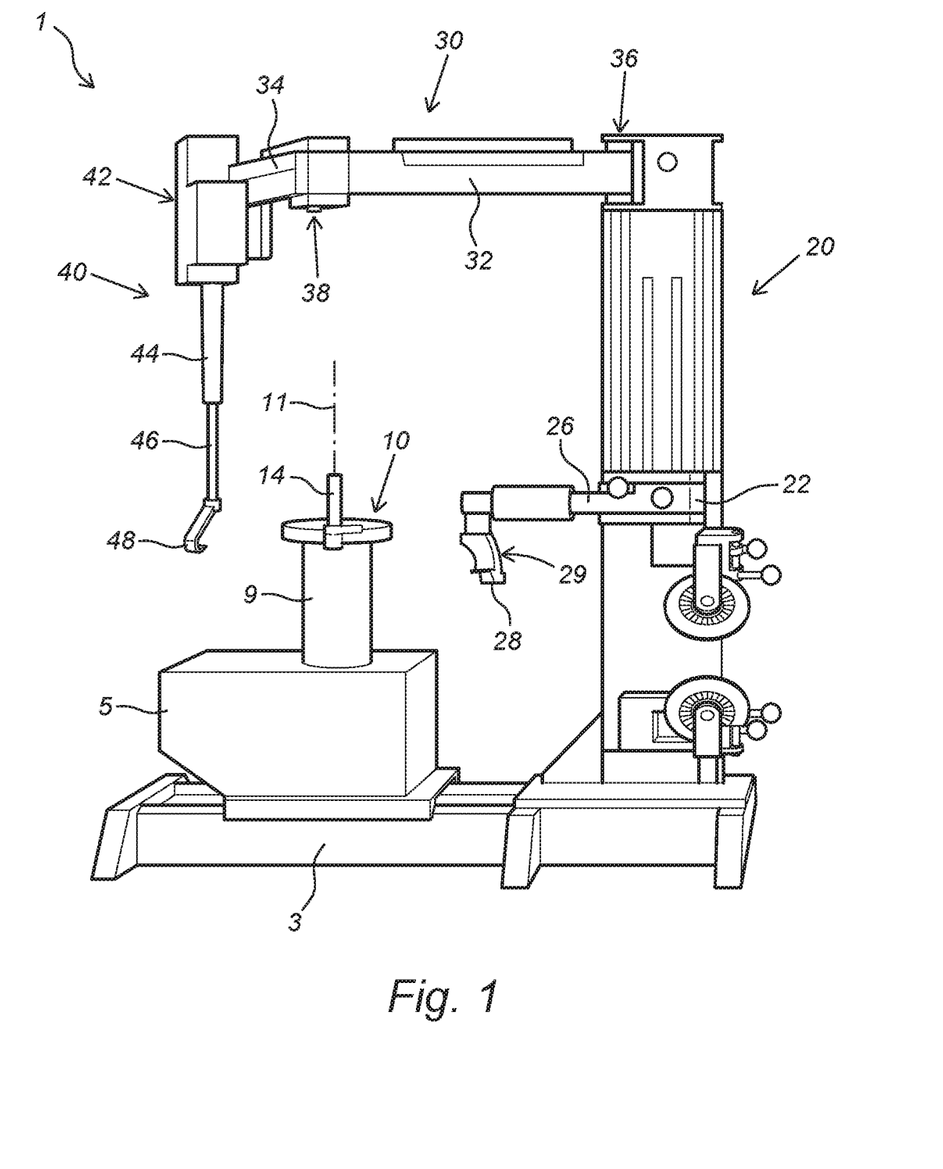
FIG. 1 is a perspective view of the dismounting machine according to the invention.

FIG. 1 shows a dismounting machine 1 for dismounting a tire from a rim. The machine 1 comprises a supporting base frame 3 that is provided with a vertical carrying body 9 for a rim (not shown), and a column 20 that is mounted at a distance from the carrying body 9.

The carrying body 9 is rotatable by electric motor relative to the base frame 3 about a rotation axis 11 that extends in a vertical direction, and is provided with a bolt 14 for fastening a rim in a fixed position on an upper side 10 of the carrying body 9, so that a principal axis of the rim thus fixed extends in a direction that coincides with the central rotation axis 11, so that rotation of the carrying body leads to rotation of the fixed rim about the principal axis. The carrying body 9 is mounted on a table 5 that is slidable horizontally relative to the base frame 3 by electric motor drive.

The vertical column 20 is provided with a guide arm 26 and an electric motor-driven adjusting mechanism 22 for height adjustment of the guide arm 26 on the column 20. The guide arm is provided at a distal end with a guide head 28 with a guiding surface 29 that is designed for guiding an inner edge of a tire (not shown) over an outer edge of the rim when the guide arm 26 is placed in the working position between the outer edge of the rim and the inner edge of the tire.

On the upper side of the column 20, an auxiliary arm 30 is connected, which is built up from two sections 32 and 34 that are linked to each other, wherein the proximal section 32 is connected swivelling to the column 20 by a vertical pivot 36. The distal section 34 is connected to proximal section 32 by a vertical pivot 38. A hook arm 40 is connected to the distal end of section 34. Thus, the hook arm can follow a circular path round the rotation axis 11 of the carrying body 9.

The hook arm 40 comprises a pneumatically driven hook mechanism 42, with a telescopically movable working arm 44, for moving, in a vertical direction, a detachably connected coupling body 46 to which a hook 48 is rigidly connected for moving an inner edge of a tire over an outer edge of the rim. The coupling body 46 is in addition rotatably connected to the working arm 44 so that the hook 48 can be turned in a desired direction. The hook 48 is preferably movable over a vertical distance of at least 15 to 45 cm.

Figure 2:
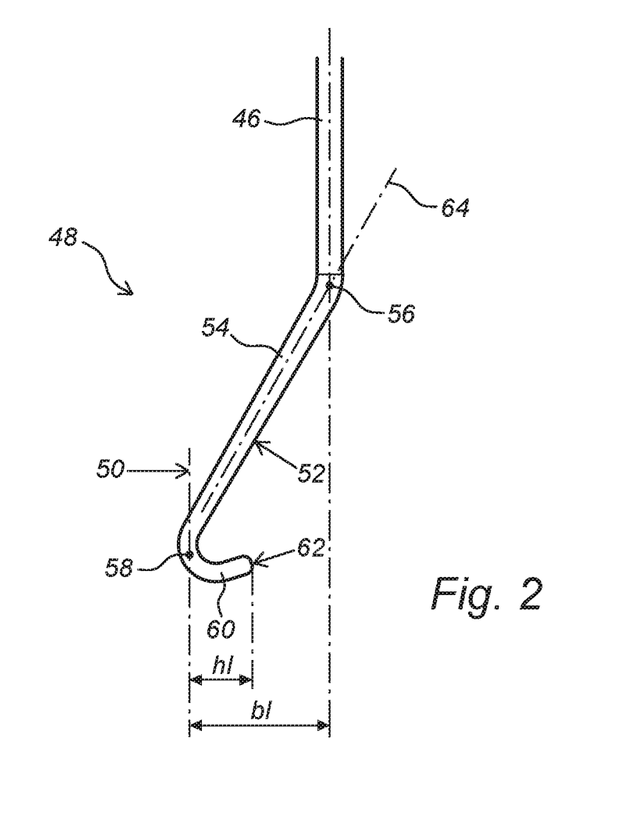
FIG. 2 is a side view of a configuration of the hook of the dismounting machine.

FIG. 2 shows in detail the hook 48 illustrated in FIG. 1, in a cross-section in a vertical plane, which is connected rigidly to the end of coupling body 46. The hook 48 has an outer side 50 and an inner side 52, and is divided into a bridge segment 54 and a hook segment 60. The bridge segment extends over a bridge length from a first end 56 that is connected to the coupling body 48, to a second end 58 that is connected to the hook segment 60. The hook segment extends over a hook length from the second end 58 to a free end of the hook 62. The bridge length in the horizontal direction is indicated as bL and the hook length in the horizontal direction as hL, wherein the value of bL is about 2.5 times greater than hL.

An end part of the hook segment 60 that comprises the free end of the hook 62 is at an angle to the horizontal plane of about 15 degrees.

The bridge segment 54 comprises an imaginary bridge line 64 that intersects the first end 56 and the second end 58 of the bridge segment, said bridge line 64 having a diagonal orientation relative to the horizontal plane, at an angle of about 60 degrees to the horizontal plane.

The outer side 50 of the hook comprises rounded areas.

Figure 3:
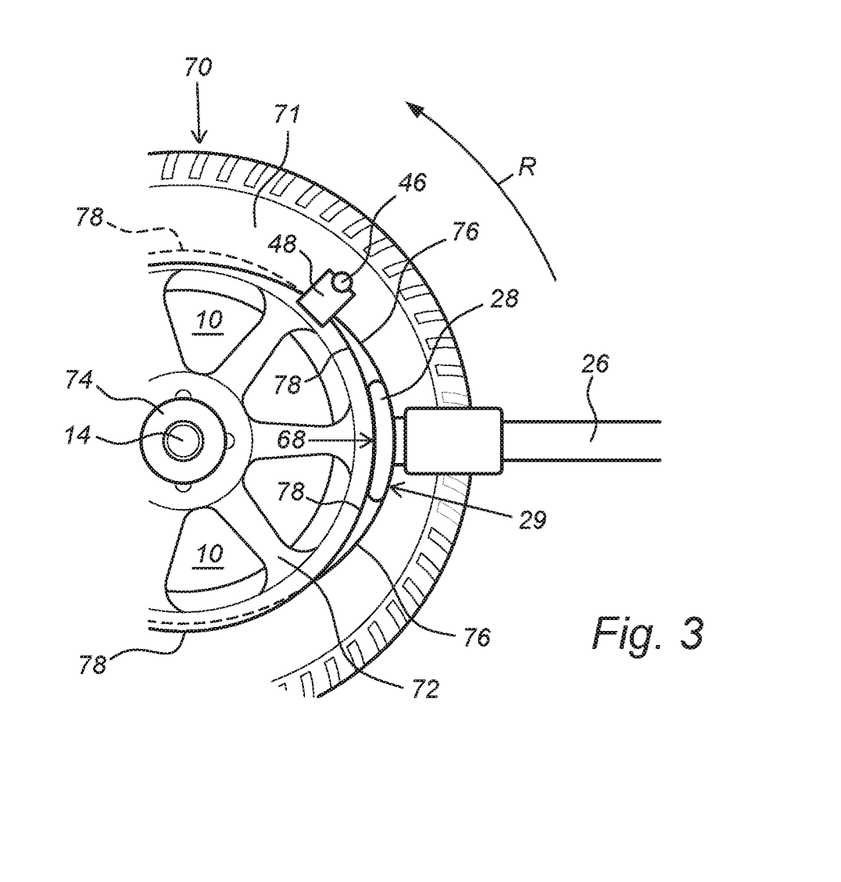
FIG. 3 presents a top view of a part of the dismounting machine during dismounting of a tire from a rim.

FIG. 3 shows a top view of a part of the dismounting machine during the dismounting phase, in which the upper side 71 of a tire 70 is mounted on a rim 72 whereas it is fixed on the upper side 10 of the carrying body by tightening a top nut 74 on the bolt 14. The guide arm 26 is positioned so that the guide head 28 lies tangentially with a front 68 against the outer edge 78 of the rim, whereas the inner edge 76 of the tire lies on the guiding surface 29 of the guide head 28.

Prior to the situation shown, a first, initial part of the inner edge of the tire 70 has already been brought over the outer edge 78 of the rim, on which the hook 48 (for clarity in FIG. 3, only shown with the coupling body 46 connected thereto) is brought into close contact behind the part shown of the inner edge 76, and is moved vertically upwards, wherein the inner edge 76 is moved over the outer edge 78 of the rim, and then the hook is held at a height of a few centimetres above the outer edge 78 of the rim.

In the situation shown, rotation of the upper side 10 of the carrying body is executed, in such a way that the rim with the tire turns in the direction of rotation R, namely anticlockwise. In engagement on the inner edge 76, the hook 48 will move along in the direction of rotation of the rim with the tire. Owing to the rotation, at the level of the guide head 28, the inner edge 76 of the tire is moved from a mounted position wherein the inner edge of the tire 76 projects behind the outer edge 78 of the rim (shown at the bottom with a dotted line for inner edge 76), to a dismounted position wherein the inner edge is brought outside the outer edge of the rim (shown at the top with a dotted line for outer edge 78).

When the carrying body 9 is rotated completely, the whole inner edge 76 is located outside the outer edge 78 of the rim 72 and the tire has been dismounted.

Figure 4:
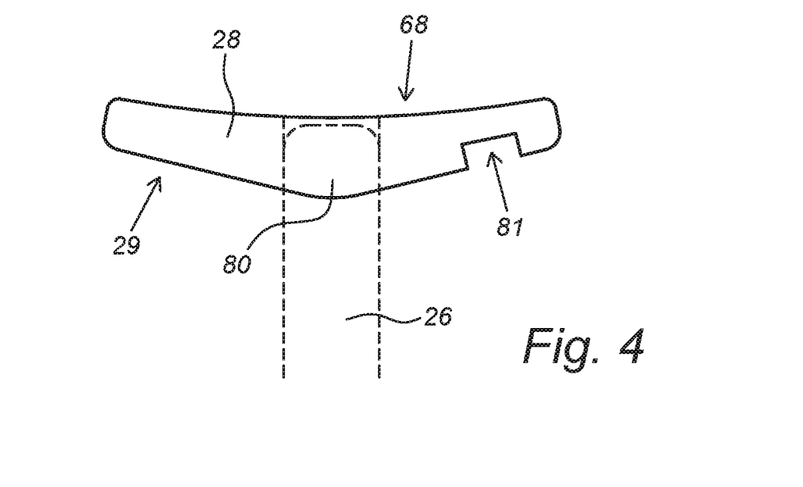
FIG. 4 is a top view of a configuration of the guiding surface of the guide head of the dismounting machine.

FIG. 4 shows a top view of a configuration of the guiding surface 29 of the guide head 28 that is connected to guide arm 26 and which can be applied in the situation shown in FIG. 3.

The guiding surface is formed in such a way that the front 68 has a concave shape, in order to seal well on the outer edge 78 of the rim. The opposite guiding surface has a bulge-shaped zone 80 and a recessed vertical sliding track 82.

This sliding track 82 is suitable for sliding an outer side 50 of the hook 48 (see FIG. 2) over it during movement of the hook in a vertical direction when an inner edge of a tire is being moved over an outer edge of the rim. In this way, the hook 48 can move the inner edge of a tire very near the guide head 28 over the outer edge of the rim, whereas the hook 48 in the subsequent steps of dismounting moves together with the inner edge of the tire, while the guide head 28 remains in the fixed working position.

The invention claimed is:

1. A dismounting machine for dismounting a tire from a rim,
comprising a supporting base frame that is provided with:
a vertical carrying body for a rim, wherein said carrying body is connected to the base frame, is rotatable by a motor relative to the base frame about a rotation axis that extends in a vertical direction, and is provided with fastening means for fastening a rim in a fixed position on an upper side of the carrying body, so that a principal axis of the rim thus fixed extends in a direction that coincides with the central rotation axis of the carrying body, so that rotation of the carrying body leads to rotation of the fixed rim about the principal axis,
a vertical column connected rigidly to the base frame, which is located at a distance from the carrying body, said column being provided with a guide arm and an auxiliary arm, which extend from the column in the direction of the carrying body, and which, movable independently of one another, are connected to the column, so that the guide arm and the auxiliary arm can be placed independently of one another in a working position as separate tools for dismounting a tire from a rim fixed on the carrying body,
wherein the column is provided with a motor-driven adjusting mechanism for adjusting the height of the guide arm on the column, and the guide arm is provided at a distal end with a guide head with a guiding surface that is designed for guiding an inner edge of a tire over an outer edge of the rim when the guide arm is in its working position between the outer edge of the rim and the inner edge of the tire,
wherein the auxiliary arm is connected swivelling with a proximal end to the column, and a distal end is provided with a hook arm, a distal end of which is connected to a hook, said hook being designed to grip behind an inner edge of a tire when the auxiliary arm is put in its working position,
wherein the hook arm comprises a motor-driven hook mechanism for moving the hook in a vertical direction for moving an inner edge of a tire over an outer edge of the rim when the auxiliary arm is put in its working position,
and wherein the auxiliary arm is connected to the column, swivelling in such a way that the hook can follow a circular path round the rotation axis of the carrying body.

2. The dismounting machine according to claim 1, wherein the auxiliary arm comprises at least two sections linked to each other, wherein a first section with a proximal end is connected swivelling to the column, and with a distal end is connected swivelling to a proximal end of a second section, wherein a distal end of the second section forms the distal end of the auxiliary arm.

3. The dismounting machine according to claim 1, wherein one or more swivel joints of the auxiliary arm are configured in such a way that the swivel joint achieves a swivelling about a vertical axis.

4. The dismounting machine according to claim 1, wherein the auxiliary arm is connected swivelling to the column at a height that is above the maximum height setting of the guide arm.

5. The dismounting machine according to claim 1, wherein the motor-driven hook mechanism comprises a working arm that is connected with a distal end to the hook, and said distal end is movable along a vertical axis, and preferably movable over a distance of at least 15 to 45 cm.

6. The dismounting machine according to claim 1, wherein the hook is mounted rotatably relative to the distal end of the auxiliary arm, so that rotation of the hook about a vertical rotation axis is possible.

7. The dismounting machine according to claim 1, wherein the hook arm comprises a coupling body that at a first end is connected to the hook, and with a second end is connected to the hook mechanism.

8. The dismounting machine according to claim 1, wherein the hook is connected detachably to the hook mechanism via a coupling connection.

9. The dismounting machine according to claim 1, wherein the dismounting machine comprises a pneumatic motor as power source for the motor drive of the hook mechanism.

10. The dismounting machine according to claim 1, wherein the hook is configured as a curved body that comprises a bridge segment and a hook segment, wherein the bridge segment and hook segment are mounted opposite each other in a common vertical plane, and wherein the bridge segment is an upper segment of the hook, and the hook segment is a lower segment of the hook that is arranged for gripping behind an inner edge of a tire,
wherein the bridge segment extends over a bridge length from a first end that is connected to the hook arm, to a second end that is connected to the hook segment, and
the hook segment extends over a hook length from a first end connected to the bridge segment, to a second end that coincides with a free end of the hook,
wherein the bridge length in the horizontal direction is greater than the hook length in the horizontal direction, in particular 2 to 6 times greater.

11. The dismounting machine according to claim 10, wherein an end part of the hook segment that comprises the free end of the hook is at an angle to the horizontal plane in the range from 0 to 30 degrees, and preferably tapers towards the free end.

12. The dismounting machine according to claim 10, wherein the bridge segment defines an imaginary bridge line that intersects the first end and the second end of the bridge segment, said bridge line having a diagonal orientation relative to the horizontal plane, and preferably is at an angle of 30 to 80 degrees to the horizontal plane.

13. The dismounting machine according to claim 1, wherein the hook has an outer side with an outside surface that comprises rounded areas.

14. The dismounting machine according to claim 1, wherein the guiding surface is provided with a recessed vertical sliding track over which an outer side of the hook can be moved with a sliding motion, in particular during movement of the hook in a vertical direction when an inner edge of a tire is being moved over an outer edge of the rim.

15. The dismounting machine according to claim 1, wherein the guiding surface of the guide head comprises a bulge which, during dismounting of a tire from a rim fixed to the carrying body, interacts with the inner edge of the tire so that the inner edge of the tire is moved over the outer edge of the rim.

16. The dismounting machine according to claim 15, wherein in the guiding surface, the recessed vertical sliding track and the bulge are at a distance from one another.

17. The dismounting machine according to claim 1, wherein the dismounting machine comprises an electric motor as power source for the motor drive of the rotatable carrying body, and/or the height-adjustable guide arm.

18. The dismounting machine according to claim 1, wherein the carrying body is mounted on a table that is slidable horizontally relative to the base frame by a motor drive, preferably an electric motor drive.

19. The dismounting machine according to claim 1, wherein the fastening means for fixing the rim comprise at least one bolt and a matching nut.

20. The dismounting machine according to claim 1, wherein one or more power sources for motor drive are installed within the base frame.

* * * * *